April 11, 1944.   A. E. SIDNELL   2,346,335
MOLD FOR MAKING PERFORATE ARTICLE
Original Filed May 9, 1939   2 Sheets-Sheet 2
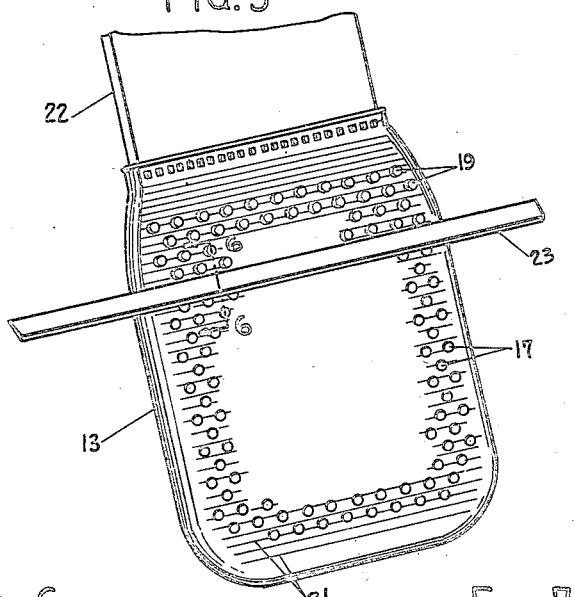
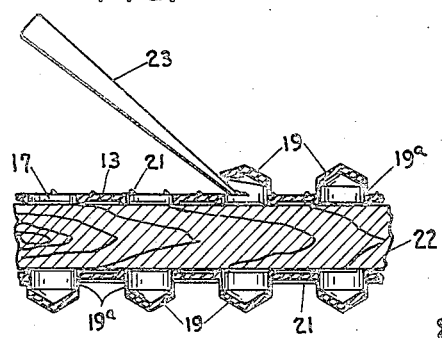
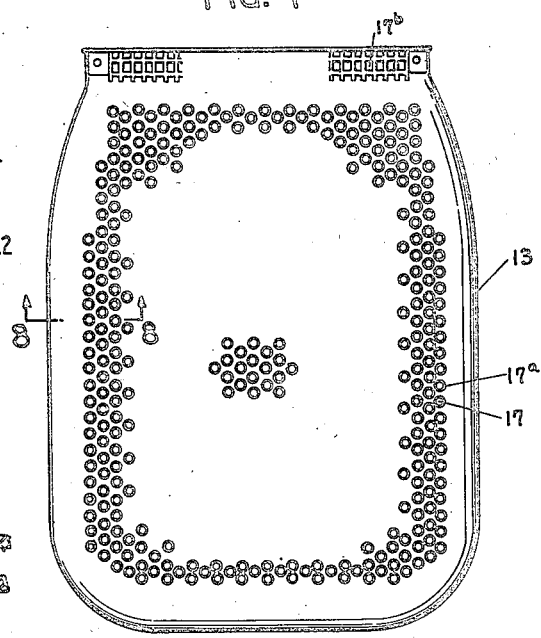
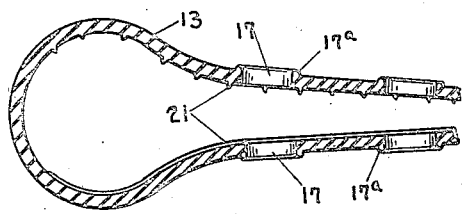
INVENTOR.
ALBERT E. SIDNELL
BY J. Ralph Barrow Patented Apr. 11, 1944

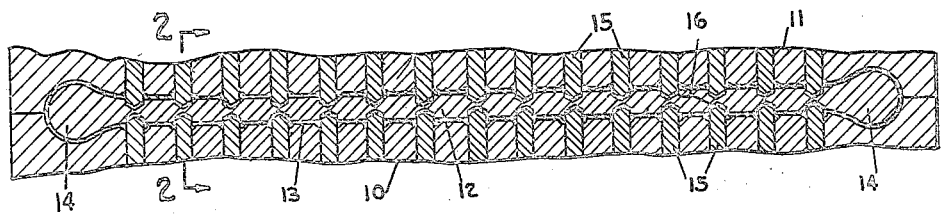
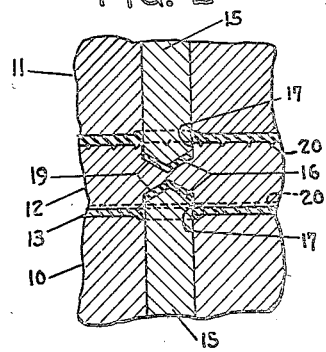
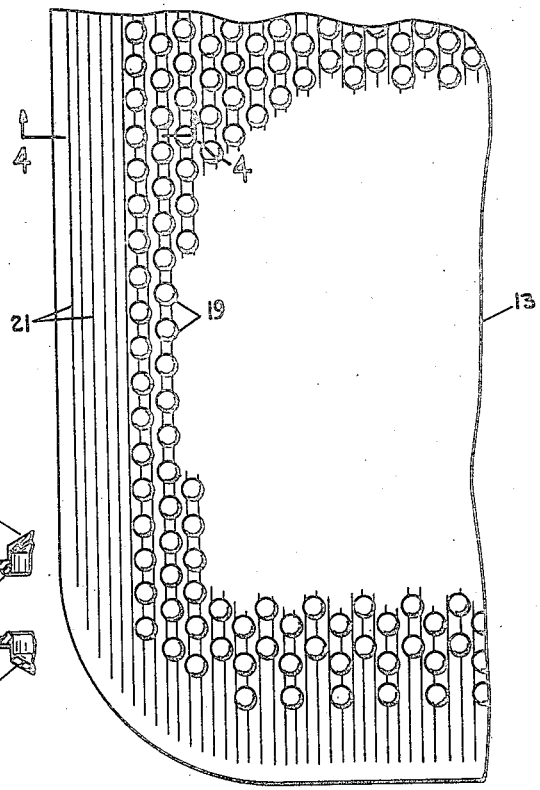
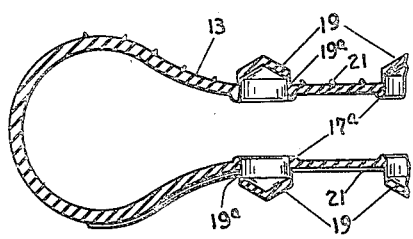

2,346,335

UNITED STATES PATENT OFFICE 2,346,335

MOLD FOR MAKING PERFORATE ARTICLES

Albert E. Sidnell, Akron, Ohio, assignor to Seiberling Latex Products Company, Barberton, Ohio, a corporation of Ohio Original application May 9, 1939, Serial No. 272,586. Divided and this application January 21, 1941, Serial No. 375,145

2 Claims. (Cl. 18—42)

This invention relates to a mold for making perforate molded articles of vulcanized rubber and in particular perforate bags of elastic or resilient material, such as rubber, of the type used by laundries for containing batches of clothes to be washed or otherwise treated.

Heretofore, in the manufacture of such perforate rubber laundry bags or like articles it has been necessary first to vulcanize the bag to shape in a mold and then, by means of expensive punching dies and heavy punching presses, to punch the perforations in the bag. Obviously, such procedure involved high production costs. Also, in the past the core used in molding the bag has been made relatively thin and flat with curved edges of small radius extending about the same to reduce the cost of the core and to reduce the weight thereof for more efficient handling by press operators. This produced a bag having edge portions normally curved about a small radius and along which splitting occurred, due to flexing and stretching of the bag at the edge portions when packed with clothes.

Another object of the invention is to provide a substantially flat vulcanized rubber bag of the character described requiring the use of a flat and therefore light core, but said core having relatively large rounded edge portions for forming the curved edge portions of the bag with a comparatively large radius to obviate splitting of the bag along these edges while the bag is in service.

These and other objects of the invention will be manifest from the following brief description and the accompanying drawings.

This application is a division of application Serial Number 272,586, filed May 9, 1939, which has matured into U. S. Patent 2,286,117.

Of the accompanying drawings:

Figure 1 is a transverse cross-section, partly broken away, through a mold as used for vulcanizing an improved laundry bag embodied in the invention.

Figure 2 is an enlarged fragmentary cross-section taken on line 2—2 of Figure 1.

Figure 3 is a view showing a portion of a bag which has been removed from the mold after vulcanization thereof and turned wrong-side out to expose the nubs formed at the perforations during vulcanization.

Figure 4 is an enlarged cross-section taken on line 4—4 of Figure 3.

Figure 5 is a perspective view illustrating the manner of mounting the bag while still wrong-side out, for removal of the nubs.

Figure 6 is an enlarged fragmentary cross-section taken on line 6—6 of Figure 5.

Figure 7 is a plan view of a finished bag in right-side-out condition.

Figure 8 is an enlarged cross-section taken on line 8—8 of Figure 7.

Referring to Figures 1 and 2 of the drawings, the numeral 10 designates the lower section, 11 the upper section, and 12 the intermediate section or core of a laundry bag mold. The manner of utilizing this mold for shaping plastic sheet rubber therein to provide a laundry bag or like article is well-known in the art.

The respective mold sections preferably are designed to form substantially flat bags 13 having the adjacent walls thereof relatively close together so as to reduce the thickness of the core, and hence the weight thereof, thereby facilitating more efficient handling of the core by press operators. To prevent splitting of bag 13 along the edge portions thereof, as described, the respective mold sections preferably are designed to form enlarged bead or rounded edge portions about the bag, as indicated at 14 (see Figure 1). The surfaces of the rounded portions 14 of the core may merge or taper into the flat surfaces thereof with a relatively large radius, so that the edge portions of the bag will merge smoothly into the closely adjacent flat walls thereof. Thus the core 12 may be of relatively thin, light weight construction and yet form rounded edge portions of large radius on the bag for the purpose above referred to.

For forming perforations in the bag, the upper and lower sections 11 and 12 may be provided with a plurality of pins 15, 15 which project from the inner faces of said sections, the projecting ends of the pins being arranged to be received in correspondingly arranged recesses 16, 16 in opposite sides of core 12, when the sections are in the relation shown in Figures 1 and 2. A very slight clearance is allowed between pins 15 and the sides of recesses 16, the clearance best suited for the present purposes having been found to be approximately .005 inch. Also, when the sections are in the press-closed positions thereof, there preferably is allowed a substantially greater clearance between the ends of the pins 15 and the bottoms of holes 16 sufficient to receive the rubber pushed out of the side-walls of bag 13 in forming perforations 17, 17 therein. This arrangement is such that relatively thick nubs 19, 19 formed in the vulcanizing process are connected to bag 13 at the edges of the perforations 17 only by a very thin film or web of rubber 19ª, so that the nubs may readily be detached to leave the perforations with substantially clean, smooth edges, as will be subsequently described.

Mold sections 10 and 11, may be provided with grooves on the inner faces thereof surrounding pins 15, so that rubber will be pressed into the grooves during the vulcanizing step to form continuous reinforcing ribs 17ª about edges adjacent the perforations.

Longitudinal grooves 20, 20 may be provided on both sides of core 12, the grooves on one side preferably extending angularly of those on the other side, so as to produce similarly angularly disposed ribs 21, 21 on the inside faces of the bag. These ribs 21, besides reinforcing the bag, prevent the sides of the bag from sticking together.

As best shown in Figures 5 and 6, after the bag 13 has been removed from the vulcanizing mold it is turned wrong-side-out to present nubs 19 to the exterior thereof and then it is stretched over a suitable flat board or form 22. By rubbing suitable straight edged tool or scraper or knife 23 over the surfaces of the bag to engage under nubs 19, the latter may rapidly be separated from the bag, by virtue of the thin web 19ª being easily disrupted or torn away from bag adjacent the perforations.

When the nubs 19 have been removed from both sides of the bag 13 the latter is turned right-side-out to present the reinforcing ribs 17ª to the exterior of the bag, as shown in Figures 7 and 8.

Thus has been provided a simple, economical procedure and apparatus for producing an improved perforate rubber article, such as the rubber laundry bag shown and described. It is to be understood that the perforations or other openings formed in the article may be any desired shape. For example, rectangular openings 17ᵇ, usually provided adjacent the closure end of the bag to receive suitable closure fastening means (not shown) may be formed in the same manner as the perforations 17.

Modifications of the invention may be resorted to without departing from the spirit thereof or the scope of the appended claims.

What is claimed is:

1. The combination of a sectional cavity mold for making laundry bags or the like of flexible, resilient sheet material and of a type which is of generally flat shape with opposite flat walls thereof relatively close together, and a core within the mold cavity having the surface thereof in spaced relation to the surface of the mold cavity to define the thickness of the walls of bags formed in the mold, said core comprising a relatively thin central plate having enlarged rounded edge portions and the mold cavity being correspondingly shaped, whereby bags formed in the mold will have relatively large rounded edge wall portions.

2. The combination of a sectional cavity mold for vulcanizing laundry bags or the like of sheet rubber and of a type which is of generally flat shape with opposite flat walls thereof relatively close together, and a core within the mold cavity having the surface thereof in spaced relation to the surface of the mold cavity to define the thickness of the walls of bags formed in the mold, said core comprising a relatively thin central plate having enlarged rounded edge portions tapering inwardly to merge with opposite faces of said central plate and the mold cavity being correspondingly shaped, whereby bags formed in the mold will have relatively large rounded edge wall portions.

ALBERT E. SIDNELL.